United States Patent [19]

Easter et al.

[11] 3,863,140

[45] Jan. 28, 1975

[54] REGULATED POWER SUPPLY INCLUDING FORWARD FEED

[75] Inventors: Finis Claude Easter, Canoga Park; Ramon Hess Aires, Granada Hills, both of Calif.; Edwin Allen Goldberg, Princeton, N.J.

[73] Assignee: RCA Corporation, New York, N.Y.

[22] Filed: Nov. 21, 1973

[21] Appl. No.: 417,922

[52] U.S. Cl.................. 323/17, 321/2, 321/18, 323/20, 323/DIG. 1
[51] Int. Cl. .............................................. G05f 1/50
[58] Field of Search .......... 321/316, 18; 323/16, 19, 323/20, 22 T, 22 SC, 38, DIG. 1

[56] References Cited
UNITED STATES PATENTS

| | | | |
|---|---|---|---|
| 3,564,388 | 2/1971 | Nolf | 321/18 |
| 3,610,961 | 10/1971 | Hewlett | 323/22 SC |
| 3,670,234 | 6/1972 | Joyce | 321/18 |

*Primary Examiner*—A. D. Pellinen
*Attorney, Agent, or Firm*—Edward J. Norton; Joseph S. Tripoli

[57] ABSTRACT

A regulated power supply having a regulator connected between a source of unregulated voltage and the primary winding of a transformer. The output terminals of the supply are connected to the secondary winding of the transformer. A control loop is provided comprising the output terminals, a control amplifier and a regulator. In addition, a forward feed control circuit is connected in circuit with the transformer and the control loop in order to provide a signal which will compensate for changes in the input signal level.

11 Claims, 4 Drawing Figures

REGULATED POWER SUPPLY INCLUDING FORWARD FEED

The invention herein described was made in the course of or under a contract or subcontract thereunder with the Department of the Navy.

The present invention relates generally to power supplies and more particularly to regulated power supplies with compensation for input signal variations.

There are many forms of regulated power supplies where a control loop is provided which senses conditions at the load so that a signal can then be fed back to a regulator in order to keep the output voltage at the load at a constant level. In certain applications the input signal to the regulator may be subject to wide variations. In some of these configurations, the loop gain of the control loop is interrelated with the input voltage. Hence, is such a situation, substantial variations of the input signal, as opposed to load variations, can affect the loop gain and may result in the loss of the ability of the control loop to regulate the output voltage at the desired level. In addition, if the conventional loop gain is increased to compensate for wide input voltage variations the transient response may be degraded and instability resulting in oscillations may occur.

The present invention provides a technique which may be termed forward feed. Forward feed is used to connote the concept of compensation for input signal changes as opposed to feedback for compensation of changing load conditions.

In a conventional voltage regulated power supply system in which the only control loop is that between the output terminal and the regulator, the performance in terms of stability of output voltage in the presence of fluctuations of the input voltage is a function of the gain and bandwidth of this negative feedback control loop. In practical power supplies, it is sometimes very difficult or even impossible to achieve a high enough stable loop gain to provide the desired performance in terms of stability of regulated output voltage in the presence of input voltage fluctuations.

Through the incorporation of forward feed, the performance of a regulated power supply against variations in the input voltage can be markedly improved without the necessity of increasing the negative feedback loop gain. Maintaining loop stability is not affected by forward feed.

One approach to providing a forward feed system in a regulated supply context is merely to generate a signal which varies in accordance with the input signal variations and then simply add this signal to the control signal which controls the conduction of current through the regulator. One problem with the simple addition process is that the control loop gain is not changed or altered to compensate for the changes in input voltage. Thus, the changes in input voltage may be too great for the control loop to provide compensation and optimum response thereto.

The present invention provides a forward feed system for a regulated power supply wherein the control loop gain is adjusted such that the loop gain is maintained substantially constant in order to minimize the effect of variations in the input signal and thus maintain the optimum output signal for a wide range of input voltage levels.

In accordance with the present invention a regulated voltage is provided at a pair of output terminals by a power supply. The supply comprises a first means for providing an unregulated input signal. A regulator means is connected between the first means and the output terminals. A control loop is also provided and is connected in circuit with the output terminals and includes the regulator means. The control loop has a gain characteristic associated therewith and controls the state of current conduction of the regulator means in response to the voltage appearing at the output terminals. In addition, a forward feed means, responsive to the input signal level, is provided for applying a signal to the control loop. The applied signal is effective to maintain the gain characteristic of the control loop substantially constant.

IN THE DRAWING

In the discussion which follows the particular embodiment of the present invention is presented in the context of a switching type voltage regulator which includes a pulse width modulator. There are, of course, many types of voltage regulators including linear regulators in which the present invention will provide useful results.

Figure 1:
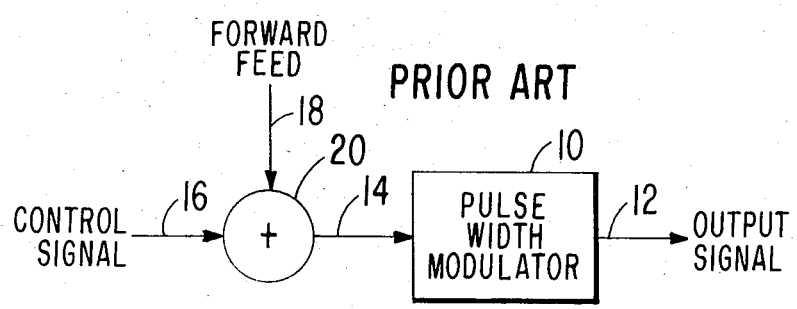
FIG. 1 is a block diagram of a prior art application of a forward feed arrangement.

Referring now to FIG. 1, a portion of a typical prior art switching regulator using forward feed is shown. The pulse width modulator 10, which is found in the regulator control loop, is a device which provides pulses of varying width on an output line 12 depending upon the level of control voltage applied thereto on line 14. Ordinarily the control voltage on line 14 would come directly from some comparator circuit where a sample of the output voltage is compared with a reference signal. In this case, however, the control voltage from the comparator appears on line 16 and is added to the forward feed signal on line 18 in adder 20. The pulse width modulated output signal on line 12 is then provided to the switching device which functions as the regulator for the overall circuit. The forward feed signal on line 18 is generated by circuitry which is located in the overall power supply ahead of the output terminals.

Figure 2:
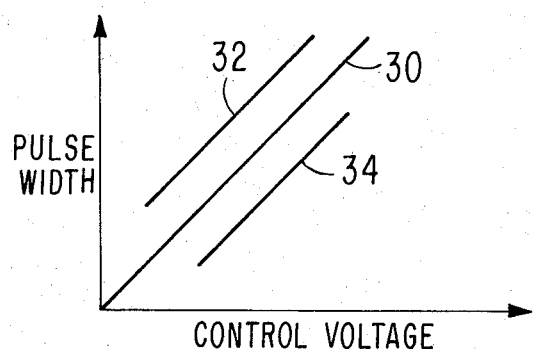
FIG. 2 is a plot of a transfer characteristic associated with the circuit of FIG. 1 showing the effect of forward feed.

FIG. 2 shows the result of forward feed on the transfer characteristic of the pulse width modulator 10 of FIG. 1. The transfer characteristic is the relationship between output pulse width and input control voltage. Without forward feed the transfer characteristic for modulator 10 is represented by line 30 in FIG. 2. With forward feed the transfer characteristic is represented by lines 32 and 34. Line 32 results when the signal on line 18 tends to increase the pulse width output on line 12. Line 34 results when the signal on line 18 tends to decrease the pulse width output on line 12. The point to be noted in FIG. 2 is that in the simple addition situation the slope of the characteristic, or the gain of the stage, remains the same. The transfer characteristic is a factor which enters into the overall loop gain of the regulator. The overall loop gain is affected by the input voltage levels. Thus, the simple arrangement of FIG. 1 will not compensate for input voltage variations in the sense that the gain of the control loop will be altered, since the slope of the transfer characteristic of the pulse width modulator is not altered, to account for input voltage variations. In order to effectively compensate for input voltage variations and keep the system output signal substantially independent of the effects of input signal changes, the slope of the transfer characteristic should be adjusted accordingly. In practical terms, in the additive arrangement when the input voltage changes by 10 percent, the loop gain changes 10 percent and the system output voltage will not remain constant.

Figure 3:
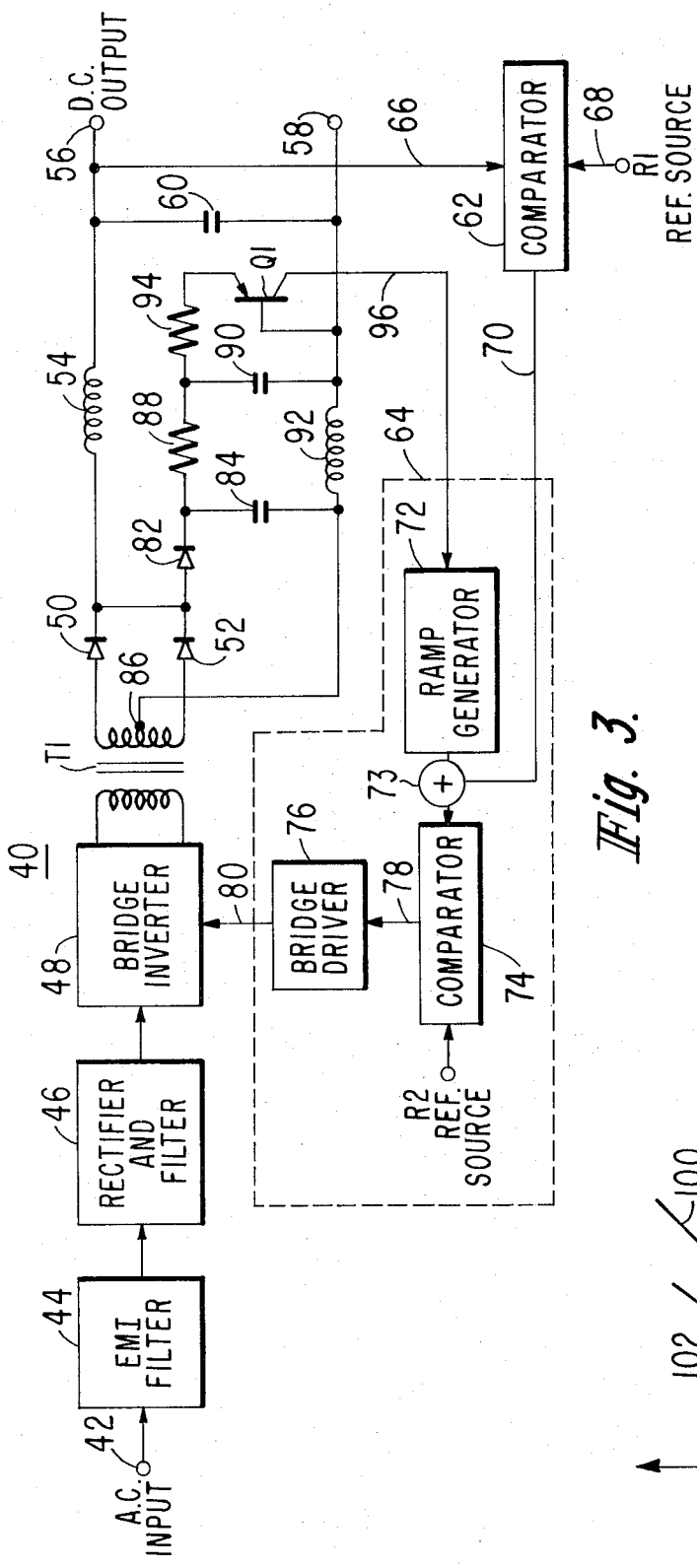
FIG. 3 is a partial block and partial schematic drawing of a power supply with forward feed in accordance with one embodiment of the present invention.

The circuit of FIG. 3, which is in the form of a switching regulator 40 provides for appropriate alteration of the transfer characteristic. In FIG. 3, an input AC signal, which may be a three-phase 400 Hz signal, is applied to input terminal 42. The AC signal is filtered through electromagnetic interference (EMI) filter 44. The EMI filtered signal is then passed through a rectifier and filter circuit 46. Circuit 46 may have many specific forms and may typically comprise a full wave diode bridge and energy storage (filter) capacitor. The resulting unregulated DC signal is then coupled to a switching device which in this case is in the form of a bridge inverter circuit 48.

Inverter 48 is connected in circuit with and provides excitation to the primary winding of a transformer T1. Diodes 50 and 52 rectify the secondary voltage of transformer T1. Inductor 54 is connected in series with diodes 50 and 52 and with output terminal 56 which is one of the two output terminals 56 and 58 of regulator 40. The utilization device (not shown) requiring a regulated voltage would be connected to terminals 56 and 58. A capacitor 60 is connected across terminals 56 and 58. Inductor 54 and capacitor 60 are part of the circuitry which provides filtering and energy storage for the switching regulator 40.

A control loop is also provided for switching regulator 40. This control loop comprises a comparator circuit 62 and a pulse width modulator shown generally as 64. Comparator 62 compares a signal related to the voltage supplied at output terminal 56 via line 66 with a reference source R1 supplied on line 68. The error signal from comparator 62 is then provided on line 70.

Pulse width modulator 64 comprises several separate circuits as shown in FIG. 3. Modulator 64 includes a ramp generator 72, a second comparator circuit 74 and a bridge driver circuit 76. In a typical switching regulator utilizing a pulse width modulator the error signals provided on line 70 would ordinarily control the generation of a pulse train whose pulse width would ultimately control the state of current conduction of the switching device which acts as the main regulator. In the pulse modulator 64 shown in FIG. 3, the ramp generator 72 provides a ramp signal to one input terminal of comparator 74. The ramp signal generated, typically, has a frequency in the range of 30–50 KHz. The error signals developed from comparator 62 which appear on line 70 are added to the ramp signal in adder 73 and the sum signal is connected to one input terminal of comparator 74. A reference source R2 is connected to a second input terminal of comparator 74. The signal generated by comparator 74 is provided to a bridge driver circuit 76 via line 78. Driver 76 then controls the switching operation taking place within the inverter 48 via line 80. Line 80 may in actual practice comprise several conductors for driving each half of a bridge inverter circuit such as might be found in inverter 48.

The forward feed circuit in FIG. 3 comprises a peak detector circuit, a filter circuit and a current source which is coupled to the ramp generator 72. The peak detector circuit comprises diode 82 and capacitor 84. The anode electrode of diode 82 is connected to the cathode electrodes of diodes 50 and 52. The cathode electrode of diode 82 is connected to one end of capacitor 84. The other end of capacitor 84 is connected to an intermediate tap or point 86 on the secondary winding of transformer T1. Diode 82 and capacitor 84, in combination, peak detect the input signal voltage which is reflected into the secondary winding of transformer T1. At this point it should be noted that there are many places in the embodiment described where changes in input voltage may be detected. In other embodiments there will be still other points at which the input signal level can be detected.

Resistor 88 is connected on one end thereof to the cathode electrode of diode 82. A capacitor 90 has one end thereof connected to the other end of resistor 88. Inductor 92, which may be viewed in combination with inductor 54 as part of a split choke, is connected between the other end of capacitor 90 and a point which is electrically connected to tap 86. Resistor 88, capacitor 90 and inductor 92 provide an AC filtering function, and in effect a change of AC reference potential from one end of split choke 92 to the other end thereof.

Resistor 94 has one end thereof connected to the junction between resistor 88 and capacitor 90. The other end of resistor 94 is connected to the emitter electrode of transistor Q1 which is of the PNP type. The base electrode of transistor Q1 is connected to the junction point between capacitor 90 and inductor 92. The collector electrode of transistor Q1 is electrically connected via line 96 to the ramp generator 72. Transistor Q1 acts as a current source for ramp generator 72. Thus it will be seen that transistor Q1 is in the present embodiment in a common base configuration. The signals carried on line 96 are supplied directly to the ramp generating mechanism within ramp generator 72. That is, typically, a current will be supplied to a capacitor which will charge up at a certain rate. The capacitor will have some type of switching mechanism connected directly across it in order to discharge the capacitor at specified times, in this case at a 30 KHz rate. Typically, line 96 will be connected to the ramp generating capacitor so that the signals which are supplied via line 96 will have a direct effect on the slope of the ramp which is generated in ramp generator 72.

In operation and under normal conditions, the switching circuit 40 will have the bridge inverter 48 controlled via the control loop comprising comparator 62 and pulse width modulator 64. The aforementioned control loop will be effective to compensate for changes in load conditions which are sensed on line 66. A measure of the input signal will be detected by the peak detector circuit comprising diode 82 and capacitor 84. The detected voltage will determine the current supplied by the current source comprising resistor 94 and transistor Q1. The current on line 96 will then determine the slope of the ramp generated by generator 72. The ramp voltage is sensed at one input terminal of comparator 74. Comparator 74 will then provide the appropriate signal to driver 76 which in turn will provide the appropriate signals to the bridge inverter 48 in order to compensate for the original variations in input signal. Thus, in FIG. 3 the forward feed signal is provided to the ramp generator 72 within the pulse modulator 64 changing the transfer function thereof as opposed to simply adding the feed forward signal on line 96 to the error signal on line 70.

The alteration of the slope of the ramp waveform provided by generator 72 has the net effect of changing the slope of the transfer function of the pulse modulator 64 and thereby compensate for the change in the loop gain. The net effect is that the loop gain appears to stay constant in the face of input voltage changes.

In practical terms, if the input voltage changes 10 percent, the gain of modulator 64 will change 10 percent maintaining virtually constant loop gain. The pulse width of the signals from modulator 64 will also change 10 percent to compensate for the line voltage change.

Figure 4:
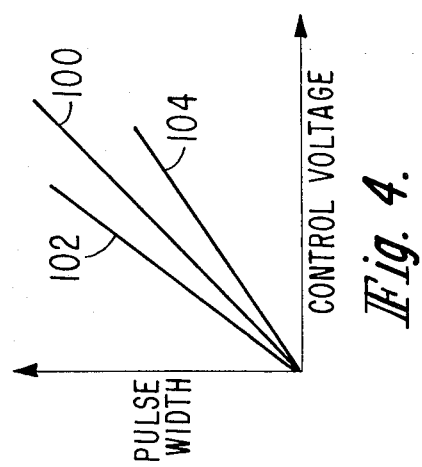
FIG. 4 is a plot of a transfer characteristic associated with the circuit of FIG. 3 showing the effect of forward feed.

FIG. 4 shows the effect of the forward feed arrangement utilized in FIG. 3. In FIG. 4 line 100 represents the nominal pulse width versus control voltage for modulator 64. Line 102 shows the effect of forward feed on the transfer characteristic when signals are being applied such that the slope of the ramp waveform is increased. Line 104 shows the effect of forward feed when the slope of the ramp waveform is being decreased. Thus it will be seen from FIG. 4 that the slope of the transfer characteristic changes as a result of the forward feed mechanism in FIG. 3 as opposed to the constant slope situation depicted in FIG. 2.

Thus, the forward feed arrangement described above provides a technique which causes the transfer characteristic of pulse width modulator 64 to be altered in such a way that the system output voltage appearing between terminals 56 and 58 is made relatively insensitive to variations in the input voltage supplied at terminal 42. The compensatory effect of the forward feed arrangement is such that the loop gain of the control loop is made to appear to be constant despite changes in input voltage.

What is claimed is:

1. A power supply circuit for providing a regulated voltage at a pair of output terminals, said circuit comprising:

first means for providing an unregulated input signal;
a transformer having a primary and a secondary winding being connected in circuit with said output terminals;
regulating means connected in circuit with said first means and said primary winding;
a control loop connected between at least one of said output terminals and said regulating means, for controlling the state of current conduction of said regulating means in response to the voltage provided at said output terminals, said control loop including a pulse width modulator having a transfer function of pulse width versus control voltage, said transfer function having a particular slope; and
second means connected in circuit with said secondary winding and said control loop for providing a signal effective to alter the slope of said transfer function in a manner to compensate for variations in said input signal and thereby to maintain said regulated voltage at said pair of output terminals.

2. The circuit according to claim 1 wherein said second means includes a peak detector and a current source connected in circuit with said secondary winding.

3. The circuit according to claim 2 wherein said pulse width modulator includes a ramp generator responsive to the signals provided from said current source for altering the slope of said transfer function.

4. The circuit according to claim 3 wherein said peak detector comprises a diode and a capacitor connected in circuit with said secondary winding.

5. The circuit according to claim 4 wherein said current source comprises a transistor in a common base configuration.

6. A switching power supply regulator circuit for providing a regulated voltage at a pair of output terminals, said circuit comprising:

first means for providing an unregulated input signal;
a transformer having a primary winding and a secondary winding, said secondary winding having an intermediate terminal and further being connected in circuit with said output terminals;
a switch regulator means connected in circuit with said first means and said primary winding;
a control loop connected between at least one of said output terminals and said switch regulator means, said loop comprising:
a. a comparator means for comparing a signal related to the voltage at said at least one output terminal and a reference signal and for providing a control signal in response to the comparison; and
b. a pulse width modulator means responsive to said control signal for controlling the state of current conduction of said switch regulator means, said modulator having a particular transfer function of pulse width versus applied control voltage associated therewith;
second means, connected in circuit with said secondary winding and said control loop, comprising a peak detector and a current source, for providing a signal to said pulse width modulator to compensate for variations in said input signal by altering said transfer function and thereby to maintain said regulated voltage at said pair of output terminals.

7. The circuit according to claim 6 wherein said peak detector comprises a diode and capacitor connected in circuit with one end of said secondary winding and said intermediate terminal.

8. The circuit according to claim 7 wherein said current source comprises a transistor in a common base configuration.

9. The circuit according to claim 8 wherein said pulse width modulator circuit comprises a ramp generator for providing a ramp waveform and wherein said current source provides a signal for controlling the slope of the ramp waveform.

10. The circuit according to claim 9 wherein said pulse width modulator further comprises a second comparator means for comparing the composite of said ramp waveform and said control signal with another reference signal and for providing a second control signal in response thereto.

11. The circuit according to claim 10 wherein said pulse width modulator further comprises a driver circuit responsive to said second control signal for providing driver control signals to said switching regulator means.

* * * * *